(12) United States Patent
Weis

(10) Patent No.: US 11,714,431 B2
(45) Date of Patent: Aug. 1, 2023

(54) FLOW RATE CONTROLLER UNIT, METHOD FOR CONTROLLING A VOLUMETRIC FLOW, AND CORRESPONDING USE

(71) Applicant: Neoperl GmbH, Mullheim (DE)

(72) Inventor: Christoph Weis, Mullheim (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 16/922,639

(22) Filed: Jul. 7, 2020

(65) Prior Publication Data

US 2021/0018939 A1  Jan. 21, 2021

(30) Foreign Application Priority Data

Jul. 15, 2019 (DE) .......................... 202019103892.6

(51) Int. Cl.
| | |
|---|---|
| *G05D 7/06* | (2006.01) |
| *F16K 1/36* | (2006.01) |
| *G05D 16/20* | (2006.01) |
| *G05D 7/01* | (2006.01) |
| *G05D 7/00* | (2006.01) |

(52) U.S. Cl.
CPC .............. *G05D 7/0629* (2013.01); *F16K 1/36* (2013.01); *G05D 16/2006* (2013.01); *G05D 7/005* (2013.01); *G05D 7/012* (2013.01)

(58) Field of Classification Search
CPC ...... G05D 7/0629; G05D 7/005; G05D 7/012; G05D 16/2006; F16K 1/36
USPC ............. 137/12, 487.5, 605, 625.14, 625.28, 137/625.3, 625.4, 599.01, 599.07; 4/623, 4/597, 607

See application file for complete search history.

(56) References Cited

U.S. PATENT DOCUMENTS

| | | | | |
|---|---|---|---|---|
| 3,905,394 A | * | 9/1975 | Jerde .................. | F02M 21/0284 431/89 |
| 4,313,465 A | * | 2/1982 | Holzem ................ | G05B 11/18 251/129.05 |
| 4,394,816 A | * | 7/1983 | Voorhis .................. | F25B 41/38 62/223 |
| 5,329,965 A | * | 7/1994 | Gordon ................. | G05D 7/0652 137/599.07 |
| 6,029,094 A | * | 2/2000 | Diffut ................. | G05D 23/1393 236/12.12 |
| 6,216,727 B1 | * | 4/2001 | Genova .................... | F17D 5/02 137/460 |
| 6,237,618 B1 | * | 5/2001 | Kushner .................. | E03B 7/071 137/1 |
| 6,438,770 B1 | * | 8/2002 | Hed .......................... | E03C 1/05 236/12.12 |
| 6,705,534 B1 | * | 3/2004 | Mueller ............. | G05D 23/1393 236/12.12 |
| 6,997,202 B2 | * | 2/2006 | Olander ............... | G05D 7/0652 137/12 |

(Continued)

FOREIGN PATENT DOCUMENTS

| | | |
|---|---|---|
| DE | 202017101427 U1 | 6/2018 |
| GB | 626608 A | 7/1949 |

*Primary Examiner* — Minh Q Le
(74) *Attorney, Agent, or Firm* — Volpe Koenig

(57) ABSTRACT

In a flow rate controller unit (1) it is thus provided to generate a temporal profile (22) of a volumetric flow, in which temporal profile (22) a switching profile by way of which at least one flow controller (6) is actuated for varying the defined volumetric flow is run.

22 Claims, 4 Drawing Sheets

(56) References Cited

U.S. PATENT DOCUMENTS

| | | | | |
|---|---|---|---|---|
| 8,132,778 | B2* | 3/2012 | Connors | F16K 19/006 |
| | | | | 251/129.04 |
| 8,434,693 | B2* | 5/2013 | Brown | E03C 1/044 |
| | | | | 236/93 A |
| 8,555,920 | B2* | 10/2013 | Hirata | G05D 7/0664 |
| | | | | 137/601.18 |
| 8,807,521 | B2 | 8/2014 | Dunki-Jacobs et al. | |
| 9,146,007 | B2* | 9/2015 | Schwaiger | H01L 21/67051 |
| 9,494,946 | B2* | 11/2016 | Yasuda | G05D 7/0617 |
| 9,657,464 | B2* | 5/2017 | Dunki-Jacobs | G05D 7/0617 |
| 10,633,842 | B2* | 4/2020 | Tayenaka | G05B 15/02 |
| 10,709,298 | B2* | 7/2020 | Yu | B05B 12/122 |
| 11,045,828 | B2* | 6/2021 | Floyd | E03C 1/057 |
| 2003/0102447 | A1* | 6/2003 | Williams, Jr. | E03C 1/057 |
| | | | | 251/129.04 |
| 2006/0248640 | A1* | 11/2006 | Leong | A61H 33/063 |
| | | | | 4/597 |
| 2009/0119832 | A1* | 5/2009 | Conroy | E03C 1/05 |
| | | | | 4/623 |
| 2011/0066297 | A1 | 3/2011 | Saberi et al. | |
| 2015/0101686 | A1 | 4/2015 | Saso | |
| 2016/0076232 | A1* | 3/2016 | Chung | E03C 1/057 |
| | | | | 4/623 |
| 2019/0391600 | A1* | 12/2019 | Hart | G05D 7/012 |

* cited by examiner

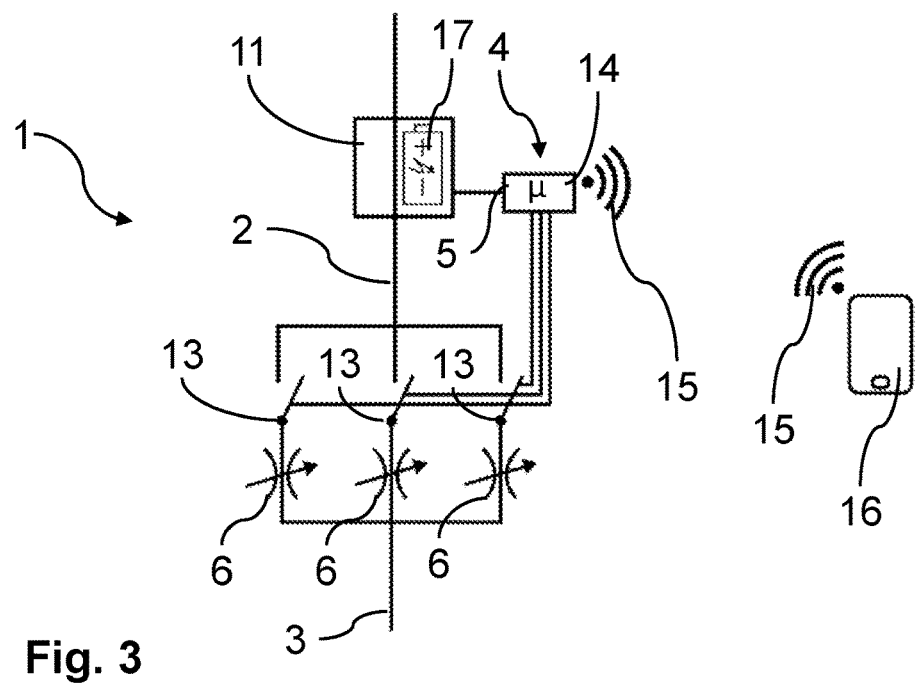
Fig. 3
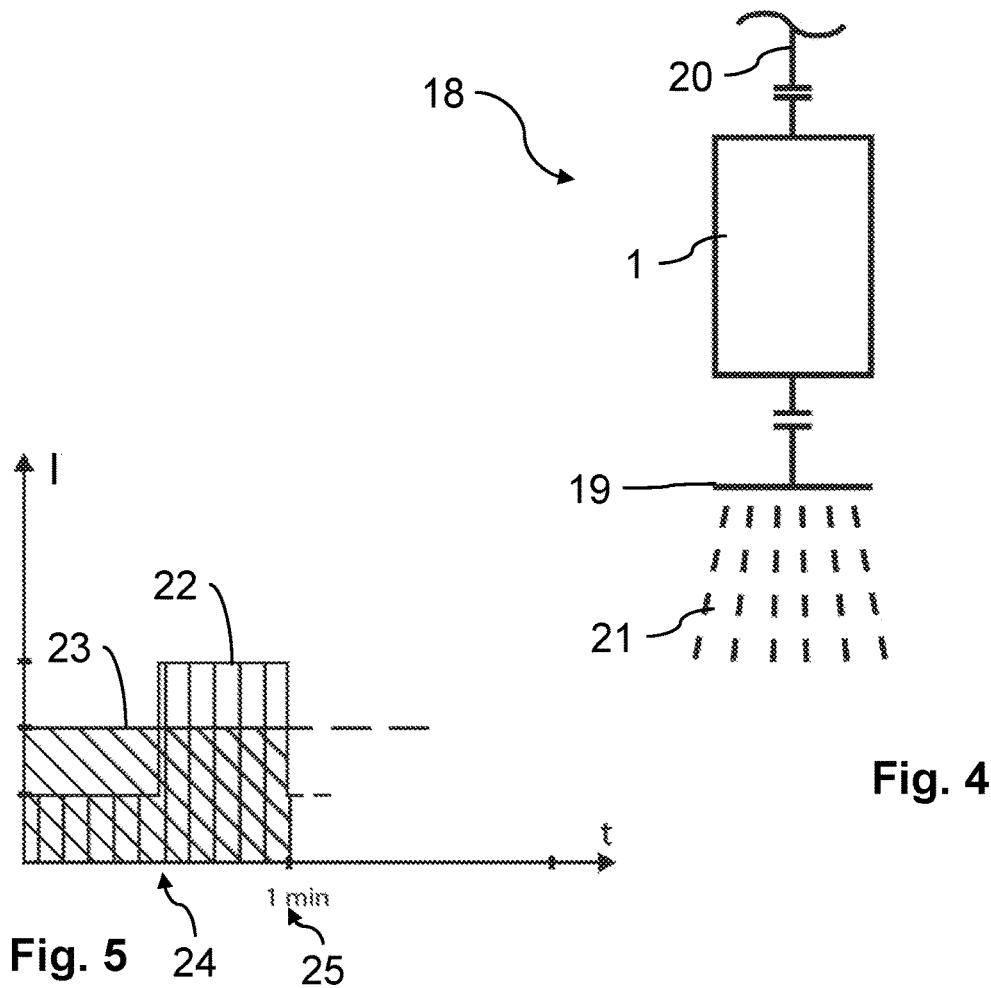
Fig. 4
Fig. 5

FLOW RATE CONTROLLER UNIT, METHOD FOR CONTROLLING A VOLUMETRIC FLOW, AND CORRESPONDING USE

INCORPORATION BY REFERENCE

The following documents are incorporated herein by reference as if fully set forth: German Patent Application No. 202019103892.6, filed Jul. 15, 2019.

TECHNICAL FIELD

The invention relates to a flow rate controller unit by way of which at least two different states of volumetric flow which implement mutually different volumetric flow/pressure control curves are able to be put into effect, wherein a switching unit which is specified for switching between the at least two different states of volumetric flows is configured.

The invention furthermore relates to a method for controlling a volumetric flow.

BACKGROUND

The operation of flow rate controller units in various countries is subject to different statutory requirements. It is often prescribed that the volumetric flow in sanitary installations such as, for example, showers must be below a predefined limit.

SUMMARY

The invention is based on the object of being able to operate a wide selection of shower heads so as to conform to statutory requirements of this type.

In order for the mentioned object to be achieved, a flow rate controller is provided with one or more features according to the invention. In a flow rate controller unit of the type described at the outset it is thus in particular provided according to the invention that a switching profile in which a predefined changeover, in a profile, takes place between said at least two, for example three or more than three, differently defined volumetric flows is stored in the switching unit. It is advantageous herein that statutory requirements are also able to be met when a predefined shower head actually requires a higher volumetric flow in order to function in an orderly manner. The invention has recognized that it can be ensured that the statutory parameters in terms of a mean value over time are reliably adhered to by applying a switching profile.

The invention enables a sufficient volumetric flow to be provided at least briefly so as to also be able to utilize shower jets which are commonplace in the spa sector, for example, when the flow rate is restricted by law. Massage functions can thus be utilized at a higher level of comfort, for example, or rinsing of shampoo can also be better carried out in the case of long hair or in the case of naturally soft water. It can also be achieved that rainforest shower heads or other shower heads which are conceived for a higher volumetric flow are used to better effect.

A defined volumetric flow as an example of a state of volumetric flow can generally be characterized in that, for example, said volumetric flow in an operating pressure range describes a pressure-independent plateau in a curve which reflects the volumetric flow as a function of the pressure loss in the flow rate controller unit. The term "defined volumetric flow" in the present description can therefore be understood, for example, as a limit value of the volumetric flow per unit of time in a specific operating pressure range.

The profile in which the changeover between the states of volumetric flow is performed can be a temporal profile, for example. A changeover can thus be triggered at fixed temporal points or based on temporally defined criteria, for example.

In one advantageous design embodiment it can be provided that at least one state of volumetric flow of the at least two different states of volumetric flow implements a volumetric flow/pressure control curve of a flow rate controller. A defined volumetric flow which is constant at least in an operating pressure range and therefore can be used for adhering to predefined volumetric flows in a predefined temporal period can thus be put into effect as state of volumetric flow.

In one advantageous design embodiment it can be provided that at least two states of volumetric flow, in particular all states of volumetric flow, are formed by a variable flow rate controller, or in each case by one flow rate controller.

In one advantageous design embodiment it can be provided that the switching unit has a driver which is able to be driven by flowing water. It is advantageous herein that energy accumulators or energy supply connectors can be dispensed with. For example, it can be provided herein that the water flows in the volumetric flow of the flow rate controller unit. Additional flow lines can thus be dispensed with. The profile of the changeovers between the states of volumetric flow herein can be caused in a directly mechanical or electrical manner, for example.

In one advantageous design embodiment it can be provided that the switching unit is configured so as to be mechanical. It is advantageous herein that current-conducting parts in the proximity of the flowing water can be dispensed with. For example, the switching unit can have a correspondingly designed cam disk.

In one advantageous design embodiment it can be provided that the switching unit is configured so as to be electrical. It is advantageous herein that practically arbitrary switching profiles can be specified.

The switching unit herein can be operated from an energy accumulator, for example a rechargeable battery or a battery. It is advantageous herein that the switching unit can be sealed in a simple manner in relation to the ingress of moisture.

Alternatively or additionally thereto, it can be provided in one advantageous design embodiment that the driver has a generator. It is advantageous herein that replacing or recharging an energy accumulator can be dispensed with.

In one advantageous design embodiment it can be provided that the flow rate controller unit has at least one flow rate controller having an adjustable control gap. Switching between at least two volumetric flows which represent in each case one state of volumetric flow can thus take place in a simple manner. For example, the control gap can be adjustable in a motorized manner. A predefined switching profile can thus be automatically run in a simple manner. In particular, it can thus be achieved that the volumetric flow is continuously variable.

In general, a flow rate controller can be characterized by a volumetric flow/pressure control curve, for example, which in an operating pressure range displays a plateau which is associated with a pressure-independent volumetric flow as the state of volumetric flow.

In one advantageous design embodiment it can be provided that the flow rate controller unit has at least one flow rate controller which is selectively able to be additionally switched on. Flow rate controllers having a fixedly predefined control gap can thus also be used. Discrete variations of the volumetric flow can thus be put into effect in a simple manner. Two or more than two identical or dissimilar flow rate controllers can thus be additionally switched on.

In one advantageous design embodiment it can be provided that the flow rate controller unit has at least one throttle which is selectively able to be additionally switched on. A non-controlled volumetric flow can thus be set at least in a state of volumetric flow. It can also be provided that the flow rate controller unit alternatively or additionally has a bypass which is selectively able to be additionally switched on. A free volumetric flow can thus be set at least in a state of volumetric flow. A bypass can be described, for example, as a limit value of a throttle toward an ever smaller flow resistance.

In one advantageous design embodiment it can be provided that a flow meter is configured for measuring a volumetric flow through the flow rate controller unit. A previously consumed volumetric flow can thus also be incorporated in controlling the profile of the states of volumetric flow, for example. It can be provided for example that the volumetric flow is detected by way of a, in particular the already mentioned, throttle and/or by way of a, in particular the already mentioned, bypass.

It can be provided that the switching unit is specified for switching between the at least two different states of volumetric flow as soon as the flow meter detects that a predefined volumetric flow has been reached. Criteria which are only indirectly based on time and represent, for example, a volumetric flow having been reached can thus also be used for changing over between the states of volumetric flow. It is subsequently possible here for achieving the predefined volumetric flow at least in terms of the mean value over a comparatively long temporal period, in particular a temporal period which is significantly longer than a temporal constant of the switching profile, to stretch the volumetric flow by switching to flow rate controllers.

In one advantageous design embodiment it can be provided that the switching unit has a memory in which the switching profile is stored. An individual switching profile can thus be predefined in a simple manner. The memory can be configured so as to be electrically readable, for example. An electric actuation of the switching profile can thus be put into effect in a simple manner. The memory is preferably configured as a variable memory. Different switching profiles can thus be stored.

In one advantageous design embodiment it can be provided that the switching unit is specified for establishing a data connection by way of which the switching profile is able to be varied. This enables the stored switching profile to be varied in a simple manner, for example by way of an external apparatus connected thereto.

In one advantageous design embodiment it can be provided that the data connection is configured so as to be wireless. This simplifies the encapsulation of the flow rate controller unit in relation to the ingress of moisture.

In one advantageous design embodiment it can be provided that the at least two differently defined states of volumetric flow have in each case a volumetric flow which is unequal to zero. A switching profile in which the flow of water is not interrupted can thus be put into effect.

Alternatively or additionally, one or more of the features directed toward a method are provided for achieving the object mentioned. In a method for controlling a volumetric flow it is thus in particular provided according to the invention for achieving the object mentioned that a predefined changeover in a profile between at least two different states of volumetric flow which implement mutually different volumetric flow/pressure control curves is automatically carried out according to a stored switching profile. An example for a use of a flow rate controller unit according to the invention, in particular as described above and/or as claimed in one of the claims directed toward a flow rate controller unit is thus demonstrated. It can thus be achieved in particular that a temporally limited high volumetric flow is compensated for by temporal portions with a reduced volumetric flow. The profile herein can be defined in temporal terms and/or by secondary parameters.

In one advantageous design embodiment it can be provided that a control gap of a flow rate controller is varied for changing over between at least two differently defined volumetric flows. A simple method for setting different volumetric flows is thus described. This variation can take place in a motorized manner, for example, preferably in an electrical manner, the latter being potentially advantageous for an electronic actuation.

In one advantageous design embodiment it can be provided that at least one flow rate controller and/or at least one throttle is additionally switched on or off for changing over between at least two differently defined states of volumetric flow. Alternatively or additionally to the at least one throttle, at least one bypass is also able to be additionally switched on and/or off. For example, different flow rate controllers having in each case different or identical volumetric flows can thus be used in particular in a mutually parallel manner, wherein overall volumetric flows set at the flow rate controller unit can be put into effect by activating or deactivating individual ones of said flow rate controllers. The entire control behavior is thus also variable in qualitative terms in that a throttle and/or a bypass are/is additionally switched on and/or off in an arrangement having at least one flow rate controller.

In one advantageous design embodiment it can be provided that the temporal profile is repeated in a cyclical manner. It is advantageous herein that temporal mean values which are formed over temporal intervals longer than one cycle are simple to define.

In one advantageous design embodiment it can be provided that a temporal mean value of the volumetric flow is kept constant. A legally defined limit value in terms of the temporal mean value can thus be adhered to in a simple manner. For example, the temporal mean value measured over at least one cycle time can be kept constant over a plurality of cycles. For example, the temporal mean value may be formed over a plurality of minutes, while a cycle may extend over a few minutes, for example 1 minute or less than 1 minute.

In one advantageous design embodiment it can be provided that the defined volumetric flow is increased at a first temporal point and decreased at a second temporal point. The second temporal point herein can be later or earlier in relation to the first temporal point, for example. It is advantageous herein that an increased water consumption can be equalized by a subsequent reduced water consumption.

In one advantageous design embodiment it can be provided that the at least two different states of volumetric flow have in each case volumetric flows which are unequal to zero. An interruption-free water flow can thus be achieved.

In one advantageous design embodiment it can be provided that at least one volumetric flow is measured in a first step, and that the switching profile is automatically calculated based on the measured volumetric flow in a second step. A learning function by way of which a flow rate controller unit can adapt itself in a self-acting manner to actually prevailing environmental conditions can thus be provided. For example, the switching profile can be ascertained by calculating temporal points for switching and/or by calculating defined volumetric flows. It can be favorable herein for the volumetric flow to be measured in a state of volumetric flow in which a throttle and/or a bypass are/is passed through by a flow. This enables standard parameters or statutory parameters to be adhered to even in volumetric flows which are non-controlled in portions.

The invention furthermore relates to a use of a flow rate controller unit according to the invention, in particular as described above, below and/or in the claims directed toward a flow rate controller unit, on a shower. The statutory requirements for limiting the consumption of water are strict specifically when showering, while many shower heads for functional reasons require a comparatively high water consumption. The use according to the invention enables these two mutually contradictory tendencies to be unified.

It is particularly favorable herein for the flow rate controller unit for carrying out a method according to the invention, in particular as described above and/or as claimed in one of the claims directed toward a method, to be used on the shower.

It can be mentioned in general that the flow rate controller unit according to the invention can be configured as a stand-alone module. This enables retrofitting in existing installations.

Alternatively, the flow rate controller unit can also be integrated in a shower head or in a sanitary fitting. This enables an external appearance to be designed in a harmonic manner.

BRIEF DESCRIPTION OF THE DRAWINGS

The invention will now be described in more detail with reference to exemplary embodiments, but is not limited to said exemplary embodiments. Further exemplary embodiments are derived by combining the features of individual claims, or of a plurality of claims, with one another and/or with individual features, or a plurality of features, of the exemplary embodiments.

In the drawings and in schematic illustrations:

FIG. 3 shows a third flow rate controller unit according to the invention;

FIG. 4 shows a use according to the invention of a flow rate controller unit according to the invention;

FIG. 5 shows an illustration of a volumetric flow as a function of time for explaining a method according to the invention;

DETAILED DESCRIPTION

Figure 1:
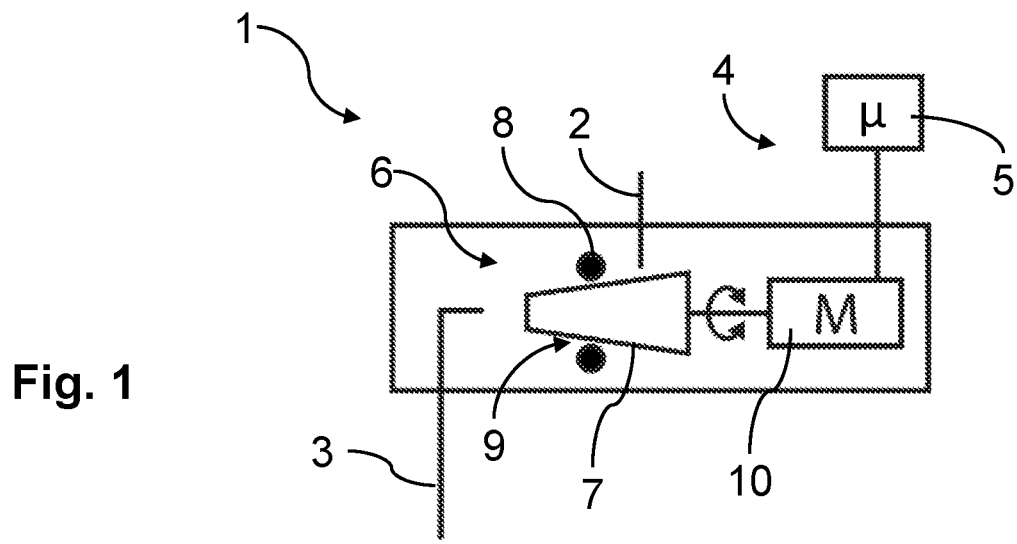
FIG. 1 shows a first flow rate controller unit according to the invention.

FIG. 1 shows a flow rate controller unit according to the invention which in its entirety is provided with the reference sign 1.

An incoming water flow 2 runs into the flow rate controller unit 1, and an outgoing water flow 3 runs out of the flow rate controller unit 1.

In a manner yet to be described in more detail, the flow rate controller unit 1 puts into effect at least two differently defined volumetric flows as at least two different states of volumetric flow in the outgoing water flow 3. In the exemplary embodiment this means that the outgoing water flow 3, at least in an operating pressure range, independently of a pressure differential between the incoming water flow 2 and the outgoing water flow 3 and thus independently of a supply pressure, for example, puts into effect a defined (for example delimited) volumetric flow which is variable.

To this end, a switching unit 4 by way of which the variation of the defined volumetric flow, or more generally the state of volumetric flow, can be effected is configured. In the present exemplary embodiment the switching unit 4 has a microcontroller 5.

A switching profile which according to a predefined profile diagram causes the variation of the defined volumetric flow as a sequence of states of volumetric flow is stored in said microcontroller 5. A predefined changeover between the at least two different states of volumetric flow which can be put into effect thus results in a temporal profile.

The flow rate controller unit 1 has a flow rate controller 6 which in a manner known per se has a control core 7 and a control body 8, a control gap 9 being configured therebetween. The control body 8 herein is configured so as to be elastically deformable such that a change in a pressure differential between the incoming water flow 2 and the outgoing water flow 3 leads to a deformation of the control body 8. This deformation varies an available opening cross section of the control gap 9. This herein is specified in a manner known per se such that an increase in pressure leads to a reduction in size of the control gap 9, while a decrease in pressure leads to an enlargement of the control gap 9. In this control arrangement, a constant (defined) volumetric flow thus results within an operating pressure range.

The flow rate controller unit 1 furthermore has a motor 10 by way of which the control core 7 is adjustable. The defined volumetric flow is thus continuously variable by adjusting the available opening cross section of the control gap 9 in the case of a non-deformed control body 8.

The microcontroller 5 correspondingly activates said motor 10 so as to actuate and carry out the adjustment of the control gap 9 according to the stored switching profile. The motor 10 is configured as an electric motor.

In a further exemplary embodiment (not illustrated in more detail), the actuation of the control core 7 is embodied in a purely mechanical manner, for example by way of a cam disk which is moved by a motor which is preferably supplied by non-electric energy.

Figure 2:
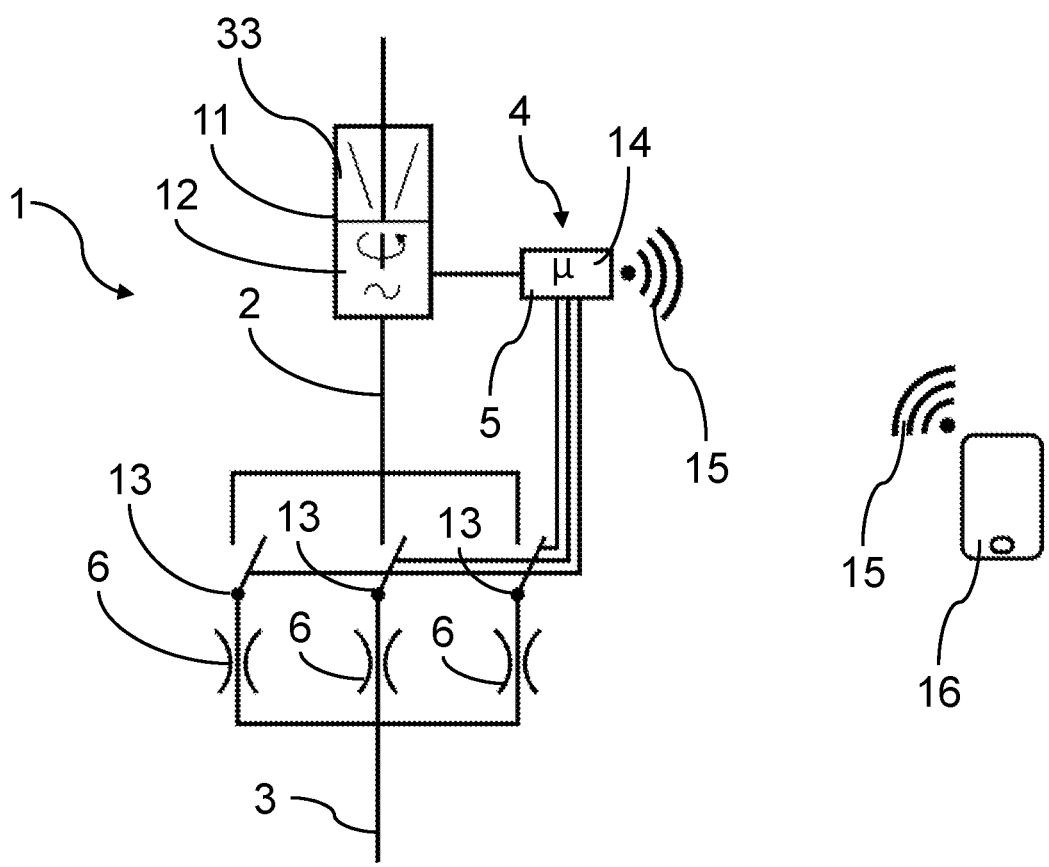
FIG. 2 shows a second flow rate controller unit according to the invention.

FIG. 2 shows a further schematic illustration of a further flow rate controller unit 1 according to the invention. Components and functional units which in terms of function and/or construction are equivalent or identical to those of the preceding exemplary embodiments are provided with the same reference signs and are not separately described. The explanations pertaining to FIG. 1 therefore apply in analogous manner to FIG. 2.

The flow rate controller unit 1 from FIG. 2 additionally has a driver 11 by way of which the switching unit 4 can be operated.

To this end, the driver 11 has a generator 12 which is driven by the incoming water flow 2 and supplies the electric switching unit 4 with electrical energy. The generator 12 herein is driven by a turbine 33 which converts part of the flow energy of the water to a mechanical form of energy such that the generator 12 can convert said mechanical energy to electrical energy. The generator 12 and the turbine 33 can be configured so as to be mutually separate or so as to be integrated in one unit.

The flow rate controller unit 1 has a plurality of flow rate controllers 6 which are switched in parallel.

Each flow rate controller 6 can be additionally switched on and off, thus be activated and deactivated, by an assigned valve 13.

The valves 13 are electrically operated by way of the switching unit 4. A memory 14 in which at least one switching profile is stored is in the switching unit 4. According to said switching profile, the switching unit 4 will open and close the valves 13 individually or collectively such that different volumetric flows are set. The flow rate controllers 6 herein can in each case put into effect uniform volumetric flows or different volumetric flows such that increments of defined volumetric flows which can be put into effect as a sequence of states of volumetric flow can be formed by combining the individual flow rate controllers 6 in the activated state.

The switching unit 4 by way of a wireless data connection 15 is connected to a mobile terminal 16 by way of which the stored switching profiles in the memory 14 can be varied or replaced.

FIG. 3 shows a schematic illustration of a further exemplary embodiment according to the invention. Components and functional units which in terms of function and/or construction are equivalent or identical to those of the preceding exemplary embodiments are again provided with the same reference signs and are not separately described once again. The explanations pertaining to the preceding exemplary embodiment therefore apply in an analogous manner to FIG. 3.

The exemplary embodiment according to FIG. 3 differs from the preceding exemplary embodiments in that the driver 11 has a rechargeable battery 17 or a battery by way of which the switching unit 4 can be operated.

The exemplary embodiment according to FIG. 3 furthermore differs from the exemplary embodiment according to FIG. 2 in that the flow rate controllers 6 are in each case configured as variable flow rate controllers in a manner analogous to that of FIG. 1. The switching unit 4 now actuates the valves 13 and, if required as a function of the parameter of the switching profile in the memory 14, also the variable flow rate controllers 6. The combination of flow rate controllers which can be additionally switched on and adjustable flow rate controllers can also be put into effect in the other exemplary embodiments.

FIG. 4 shows an exemplary use of one of the flow rate controller units 1 from the exemplary embodiments, or according to the invention.

A shower 18 has a shower head 19 and a water connector 20.

The flow rate controller unit 1 is installed in such a manner between the shower head 19 and the water connector 20 that the water connector 20 provides the incoming water flow 2 and the shower head 19 receives the outgoing water flow 3.

The outgoing water flow 3 thus determines the volumetric flow in the exiting water jet 21 of the shower head 19.

FIG. 5 serves for explaining the method according to the invention.

Illustrated is a diagram of the defined volumetric flow I, thus of the temporal delivery of the volumetric flow, over time t.

The diagram shows the temporal profile 22 which is predefined by the switching profile and which describes a variation about a temporal mean value 23 of the volumetric flow.

A volumetric flow which is lower than the temporal mean value 23 is set up to a first temporal point 24. The defined volumetric flow is increased at said first temporal point 24, for example by additionally switching on a flow rate controller, switching to another flow rate controller, and/or re-setting a variable flow rate controller. The volumetric flow is reduced back to the lower value at a second temporal point 25, and the cycle restarts.

The area under the curve of the temporal profile 22 is equal to the area under the temporal mean value 23 such that an overall adherence to statutory stipulations results even when said stipulation is briefly deviated from.

The temporal profile is assumed to be an incremental function in the exemplary embodiment according to FIG. 5. Practically arbitrary curves can be achieved in particular when using flow meters 29 and/or flow rate controllers 6 which can be adjusted in a motorized manner.

The invention enables a volumetric flow to be temporally integrated and it to be ensured by way of a switching unit that an area below a volumetric flow curve does not exceed a stipulation within a temporal interval.

Figure 6:
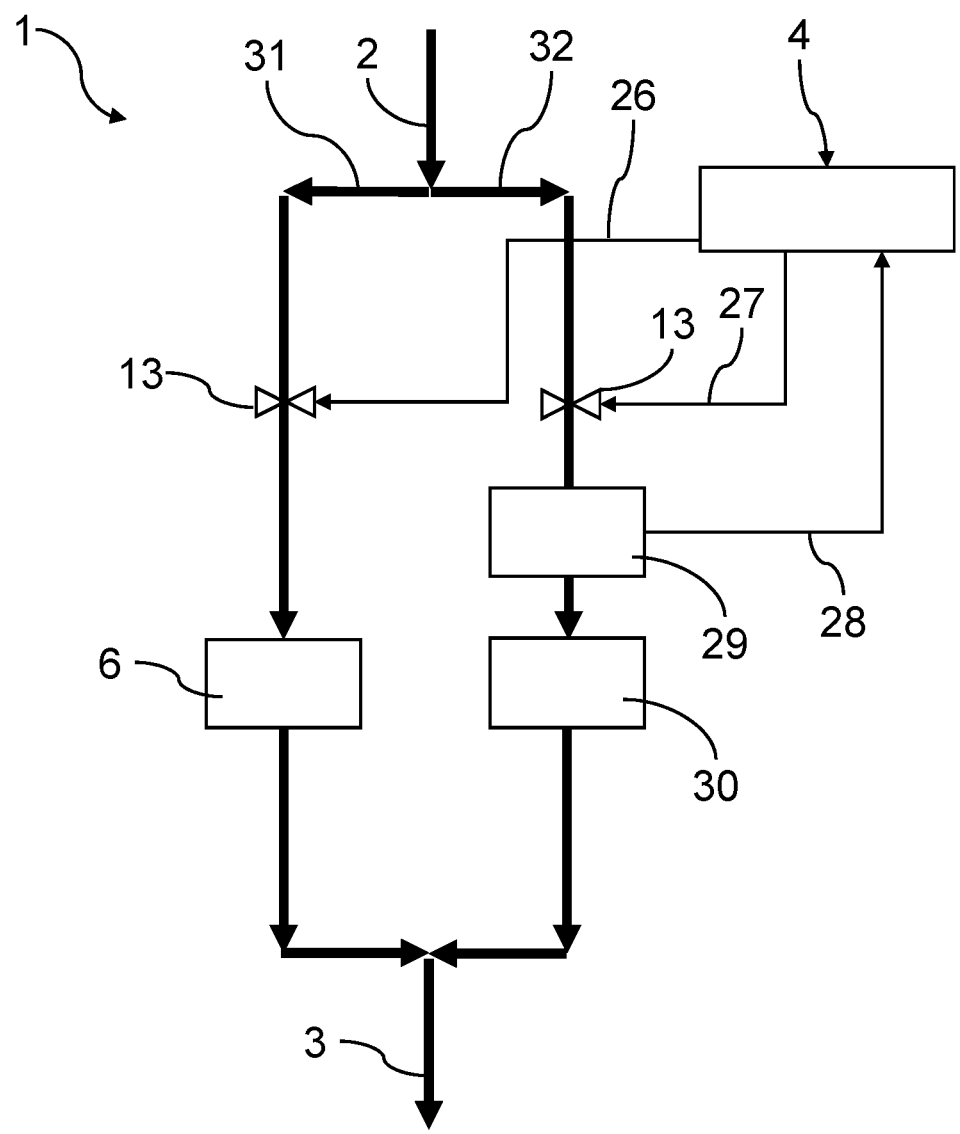
FIG. 6 shows a fourth flow rate controller unit according to the invention.

FIG. 6 shows a schematic illustration of a further exemplary embodiment according to the invention. Components and functional units which in terms of function and/or construction are equivalent or identical to those of the preceding exemplary embodiments are again provided with the same reference signs and are not separately described once again. The explanations pertaining to the preceding exemplary embodiments therefore apply in an analogous manner to FIG. 6.

In the exemplary embodiment according to FIG. 6 the incoming water flow 2 is divided into (at least) two sub-streams 31, 32.

One sub-stream 31 is guided by way of a flow rate controller 6, and one sub-stream 32 is guided by way of a throttle 30. Said throttle 30 can be a separate component, for example a perforated disk or a perforated aperture, or be the result of a flow resistance in the sub-stream 32. The throttle 30 can thus also be a bypass 39 in which the flow resistance across the length thereof is not or not noticeably variable but is substantially constant or consistent.

The flow rate controller 6 herein puts into effect a volumetric flow/pressure control curve which from a specific pressure at which an operating pressure range starts describes a constant volumetric flow that is independent of pressure.

The throttle 30 herein puts into effect a volumetric flow/pressure control curve which increases in a practically unlimited manner, for example according to a root function.

The switching unit 4 actuates valves 13 such that either the sub-stream 31 or the sub-stream 32, or both sub-streams 31, 32 is/are active. In further exemplary embodiments a different number of flow rate controllers and/or throttles is configured by way of which one sub-stream is in each case guided.

A flow meter 29 by way of which a volumetric flow can be detected in an integrated manner is disposed in the sub-stream 32 of the throttle 30.

In a variant which can be put into effect in a simple manner in terms of construction, the flow meter 29 can preferably have magnetically and/or optically characterized wings 38 of a vane 35 (cf. FIG. 7), wherein a passing movement of the characterized wings 38 can be detected preferably in a magnetic and/or optical manner by way of a sensor 36.

In exemplary embodiments in which a driver 11 has a turbine 33 the flow meter 29 can also be configured on the turbine 33 or conjointly with the turbine 33.

The flow meter 29 transmits the measured data thereof to the switching unit 4 by way of the control line 28.

The switching unit 4 switches off the sub-stream 32 by the throttle 30 as soon as a predefined value for an integrated volumetric flow has been reached, and by way of the flow rate controller 6 activates the sub-stream 31 for a sufficiently long temporal period so as to bring a volumetric flow to a predefined value within a temporal interval.

The use of a flow meter 29 also enables a learning function to be put into effect. In said learning function, a volumetric flow is first measured for different settings, or at least for one setting, of the flow rate controller unit. Using said measured value, a switching profile which for the actually prevailing conditions, in particular for an actually prevailing supply pressure and/or for an actually prevailing flow resistance of a connected shower head, ensures that a maximum volumetric flow is adhered to within a temporal interval is subsequently calculated. This learning function may be able to be carried out repeatedly at regular intervals and/or on demand by a user, for example.

Figure 7:
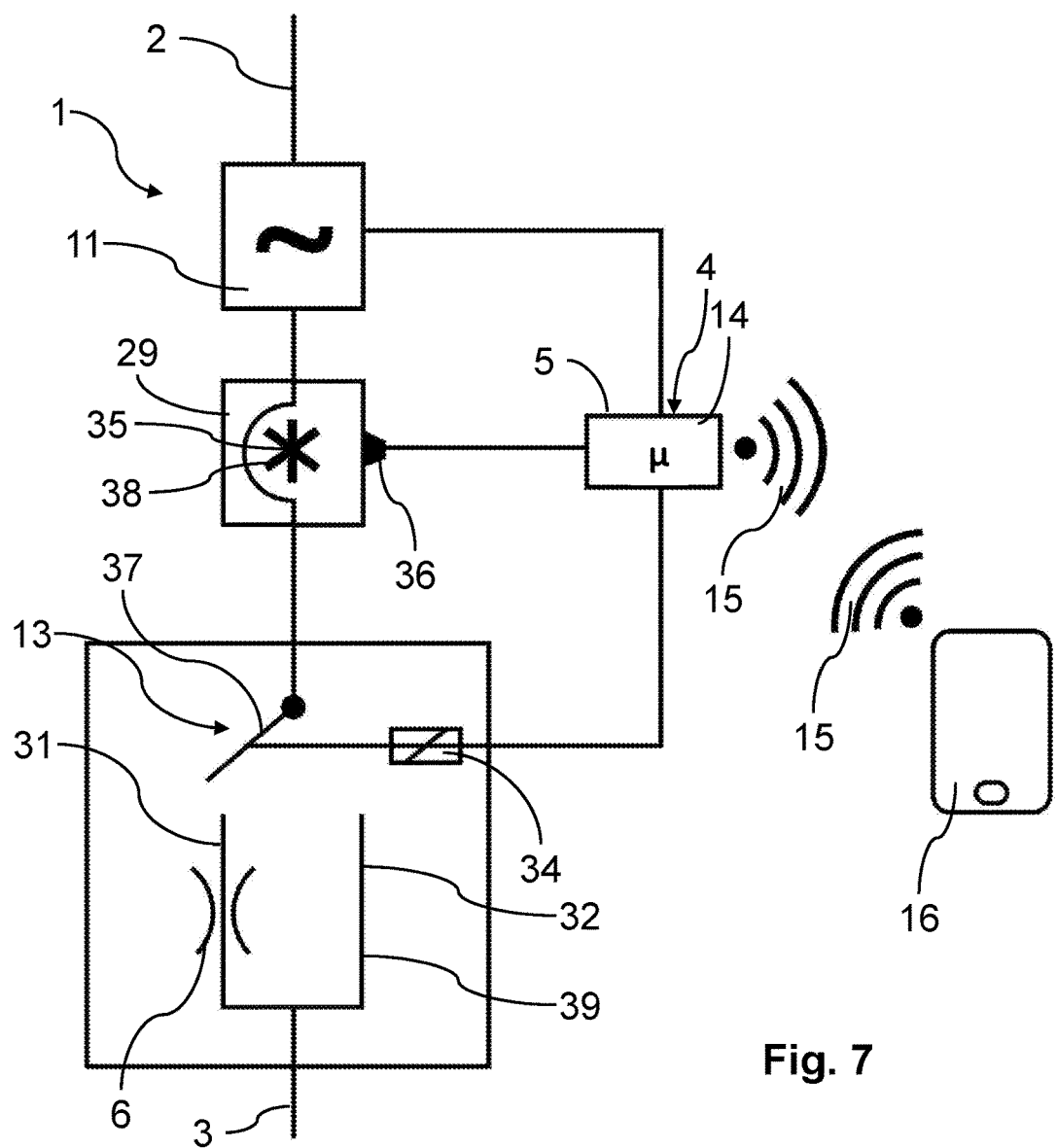
FIG. 7 shows a fifth flow rate controller unit according to the invention.

FIG. 7 shows a schematic illustration of a further exemplary embodiment according to the invention. Components and functional units which in terms of function and/or construction are equivalent or identical to those of the preceding exemplary embodiments are again provided with the same reference signs and are not separately described once again. The explanations pertaining to the preceding exemplary embodiments therefore apply in an analogous manner to FIG. 7.

In the exemplary embodiment according to FIG. 7 the incoming water flow 2 passes through a driver 11, for example one of the drivers 11 described above, and subsequently through a flow meter 29 which may be configured according to the flow meter 29 described above, for example. The sequence of the driver 11 and the flow meter 29 may also be reversed.

The flow meter 29 in FIG. 7 has a vane 35, the wings 38 thereof being partly or completely marked, for example magnetically, optically and/or electrically marked. A sensor 36 interacts with the marked wing 38 or the marked wings 38 so as to generate electrical impulses. Said impulses are directed to a switching unit 4 so as to form a measured value for a volumetric flow.

The switching unit 4 has a microcontroller 5 which actuates a valve 13 by way of a bi-stable switch 34. Other switches can also be used, but a bi-stable switch, for example a magnetically operating switch, has the advantage that energy is required only for activation.

The valve 13 herein is configured as a switchover valve 37 so as to selectively direct the incoming water flow 2 to a first sub-stream 31 and/or a second sub-stream 32. However, an arrangement of valves 13 according to FIG. 6 can also be used.

A flow rate controller 6 which sets a defined volumetric flow as a first state of volumetric flow is provided in the first sub-stream 31.

This defined volumetric flow is dimensioned such that a volumetric flow predefined for a predetermined unit of time by law for the measured volumetric flow can be adhered to by dwelling in the second state of volumetric flow for a correspondingly long time.

As soon as the switching unit 4 by way of the flow meter 29 establishes that a predefined volumetric flow has flowed within a specific temporal interval, the switchover valve 37 is activated so as to direct the incoming water flow 2 to the second sub-stream 32.

The second sub-stream 32 in FIG. 7 in a second state of volumetric flow is directed without impediment (for example as a bypass 39, or potentially impeded by a throttle 30) to the outgoing water flow 3.

The switching between the states of volumetric flow can take place at fixedly stored temporal points, for example. This will be favorable in particular when the states of volumetric flow form in each case a defined volumetric flow, for example by way of a variable flow rate controller 6 or a plurality of different flow rate controllers.

Figure 8:
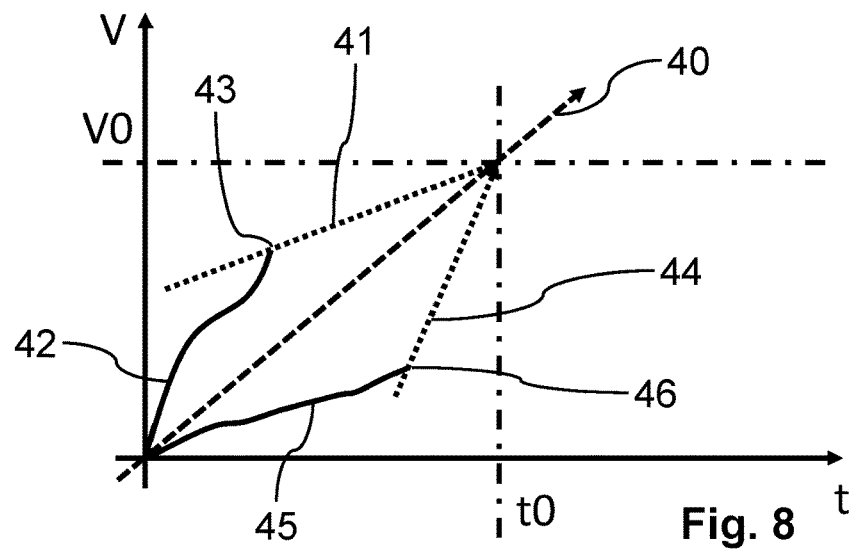
FIG. 8 shows a volumetric flow/time diagram for explaining a variant of the invention.

However, a method according to FIG. 8 may also be put into effect.

FIG. 8 herein shows a volumetric flow (V) over time (t) diagram. Illustrated is a curve 40 which describes a statutory parameter, or a parameter according to a standard, of a volumetric flow in which a volumetric flow V0 flows within a temporal interval t0. This curve 40 may correspond to the mean value 23 from FIG. 5.

It is assumed that a flow rate controller 6 of which the gradient corresponds to the curve 41 is used. The curve 41 is however displaced such that said curve 41 runs through the intersection point (t0, V0).

If an arbitrary curve 42 is now generated in a first state of volumetric flow, the gradient of said curve obviously being greater than the stipulation according to the curve 40, an intersection point 43 of the curve 42 and the curve 41 results. The curve 42 herein is measured by the flow meter 29. The curve 42 may describe a non-controlled volumetric flow which is intensely throttled.

This intersection point 43 is calculated by the switching unit 4. This results in a temporal point for changing the state of volumetric flow. The switching unit 4 varies the switching profile so as to initiate said change at the calculated temporal point.

If the state of volumetric flow is changed at this temporal point such that the mentioned flow rate controller 6 takes over, the system thus follows the curve 41 up to the intersection point (t0, V0).

The stipulation of V0 within the temporal interval t0 is thus adhered to, wherein a consumption which is higher than the stipulation by way of the curve 40 is enabled in the first state of volumetric flow.

It is assumed that a flow rate controller 6 of which the gradient corresponds to that of the curve 44 is used. The curve 44 is however displaced such that said curve 44 runs through the intersection point (t0, V0).

If an arbitrary curve 45 of which the gradient is obviously flatter than the stipulation according to the curve 40 is now generated in a first state of volumetric flow, this results in an intersection point 46 of the curve 45 and the curve 44. The curve 45 herein is measured by the flow meter 29. The curve 45 may describe a non-controlled, in particular a free or impeded, volumetric flow.

This intersection point 46 is calculated by the switching unit 4. This results in a temporal point for changing over the state of volumetric flow. The switching unit 4 varies the switching profile so as to initiate said change at the calculated temporal point.

If the state of volumetric flow is changed at said temporal point such that the mentioned flow rate controller 6 takes over, the system thus follows the curve 44 up to the intersection point (t0, V0).

The stipulation of V0 within the temporal interval t0 is thus adhered to, wherein a consumption which is higher than the stipulation by the curve 40 is enabled in the second state of volumetric flow. This corresponds to the temporal profile 22 in FIG. 5, for example.

In the flow rate controller unit 1 according to the invention it is thus provided to generate a temporal profile 22 of a volumetric flow by running a switching profile by way of which at least one flow rate controller 6 is actuated for varying the volumetric flow.

LIST OF REFERENCE SIGNS

1 Flow rate controller unit
2 Incoming water flow
3 Outgoing water flow
4 Switching unit
5 Microcontroller
6 Flow rate controller
7 Control core
8 Control body
9 Control gap
10 Motor
11 Driver
12 Generator
13 Valve
14 Memory
15 Data connection
16 Mobile terminal
17 Rechargeable battery
18 Shower
19 Shower head
20 Water connector
21 Water jet
22 Temporal profile
23 Temporal mean value of the volumetric flow
24 First temporal point
25 Second temporal point
26 Control line
27 Control line
28 Control line
29 Flow meter
30 Throttle
31 Sub-stream
32 Sub-stream
33 Turbine
34 Bistable switch
35 Vane
36 Sensor
37 Switchover valve
38 Wing
39 Bypass
40 Curve
41 Curve
42 Curve
43 Intersection point
44 Curve
45 Curve
46 Intersection point

The invention claimed is:

1. A flow rate controller unit (1) configured to provide at least two different states of volumetric water flow which implement mutually different volumetric water flow/pressure control curves, comprising:
a switching unit (4) configured for switching between the at least two different states of volumetric flow in which a switching profile in which a predefined changeover takes place between said at least two different states of volumetric water flow is stored in the switching unit (4), and
a flow meter (29) configured for measuring a volumetric flow of water through the flow rate controller unit (1), and the switching unit (4) is configured for switching between the at least two different states of volumetric water flow as soon as the flow meter (29) detects that a predefined flow rate has been reached.

2. The flow rate controller unit (1) as claimed in claim 1, wherein at least one of the states of volumetric water flow of the at least two different states of volumetric water flow implements a volumetric flow/pressure control curve of a flow rate controller.

3. The flow rate controller unit (1) as claimed in claim 1, wherein the switching unit includes a driver (11) configured to be driven by the water flowing in the volumetric water flow.

4. The flow rate controller unit (1) as claimed in claim 3, wherein the driver (11) has a generator (12).

5. The flow rate controller unit (1) as claimed in claim 1, wherein the switching unit (4) is mechanical.

6. The flow rate controller unit (1) as claimed in claim 1, wherein the switching unit (4) is electrical.

7. The flow rate controller unit (1) as claimed in claim 1, wherein the flow rate controller unit (1) comprises a flow rate controller (6) having a control gap (9) that is settable via a motor.

8. The flow rate controller unit (1) as claimed in claim 1, wherein the flow rate controller unit (1) comprises at least one flow rate controller (6) which is selectively able to be additionally switched on.

9. The flow rate controller unit (1) as claimed in claim 1, further comprising at least one throttle (30) which is selectively able to be additionally switched on, or a bypass (39) which is selectively able to be additionally switched on, or a throttle and a bypass that are selectively able to be additionally switched on.

10. The flow rate controller unit (1) as claimed in claim 1, wherein the switching unit (4) has a variable memory (14) in which the switching profile is stored.

11. The flow rate controller unit (1) as claimed in claim 10, wherein the switching unit (4) is configured to establish a data connection (15) by which the switching profile (4) is able to be varied.

12. The flow rate controller unit (1) as claimed in claim 11, wherein the data connection (15) is configured to be wireless.

13. The flow rate controller unit (1) as claimed in claim 1, wherein the at least two differently defined volumetric water flows are in each case selected so as to be unequal to zero.

14. A method for controlling a volumetric water flow, comprising:
automatically carrying out a predefined changeover between at least two different states of volumetric water flow which implement mutually different volumetric water flow/pressure control curves according to a stored switching profile (4), wherein a changeover between the at least two different states of volumetric water flow takes place as soon as a predefined flow rate is exceeded.

15. The method as claimed in claim 14, further comprising varying a control gap of a flow rate controller (6) using a motor for changing over between the at least two different states of volumetric water flow.

16. The method as claimed in claim 14, wherein at least one of a flow rate controller (6), a throttle, or a bypass (39)

are additionally switched on or off for changing over between the at least two different states of volumetric water flow.

17. The method as claimed in claim 14, wherein the stored switching profile is a temporal profile (22) that is repeated in a cyclical manner.

18. The method as claimed in claim 14, wherein a temporal mean value of the volumetric water flow (23) measured over at least a time of one cycle is kept constant.

19. The method as claimed in claim 14, wherein the at least two different states of volumetric water flow have in each case volumetric water flows that are unequal to zero.

20. The method as claimed in claim 14, further comprising measuring at least one of the volumetric water flows is measured in a first step, and automatically calculating the switching based on the measured volumetric water flow in a second step.

21. The method of claim 14, wherein the volumetric water flow is in a shower (18).

22. A method for controlling a volumetric water flow, the method comprising:
   automatically carrying out a predefined changeover between at least two different states of volumetric water flow which implement mutually different volumetric water flow/pressure control curves according to a stored switching profile (4) increasing a defined volumetric water flow at a first temporal point and decreasing the volumetric water flow rate at a second temporal point.

\* \* \* \* \*